(12) United States Patent
Sumanaweera et al.

(10) Patent No.: US 7,119,810 B2
(45) Date of Patent: Oct. 10, 2006

(54) GRAPHICS PROCESSING UNIT FOR SIMULATION OR MEDICAL DIAGNOSTIC IMAGING

(75) Inventors: Thilaka S. Sumanaweera, Los Altos, CA (US); John W. Cherry, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 59 days.

(21) Appl. No.: 10/728,666

(22) Filed: Dec. 5, 2003

(65) Prior Publication Data

US 2005/0122333 A1 Jun. 9, 2005

(51) Int. Cl.
*G06T 1/20* (2006.01)
*G06F 15/16* (2006.01)

(52) U.S. Cl. ...................... 345/506; 345/502
(58) Field of Classification Search ........ 345/501–506, 345/519, 520, 522; 600/437, 407, 424, 425, 600/453–457
See application file for complete search history.

(56) References Cited

U.S. PATENT DOCUMENTS

| | | | |
|---|---|---|---|
| 5,682,896 A * | 11/1997 | Scheib et al. ............... | 600/456 |
| 5,709,209 A | 1/1998 | Friemel et al. | |
| 5,787,889 A | 8/1998 | Edwards et al. | |
| 6,464,641 B1 * | 10/2002 | Pan et al. .................... | 600/453 |
| 6,629,926 B1 | 10/2003 | Finger et al. | |
| 6,685,641 B1 | 2/2004 | Liu | |
| 6,784,894 B1 * | 8/2004 | Schimpf et al. ............ | 345/581 |
| 6,852,081 B1 | 2/2005 | Sumanaweera et al. | |
| 6,896,657 B1 * | 5/2005 | Willis ......................... | 600/437 |
| 2004/0193042 A1 * | 9/2004 | Scampini et al. ........... | 600/424 |
| 2005/0043619 A1 | 2/2005 | Sumanaweera et al. | |
| 2005/0110793 A1 * | 5/2005 | Steen ......................... | 345/536 |

* cited by examiner

*Primary Examiner*—Kee M. Tung
*Assistant Examiner*—Hau Nguyen

(57) ABSTRACT

Methods and systems provide simulation or medical diagnostic imaging with a graphics processing unit. Data to be processed by a graphics processing unit is transferred from a source to the graphics processing unit without copying by the central processing unit. For example, the central processing unit does not copy data to the cache. Instead, the source of data transfers the data directly to the graphics processing unit or directly to a graphics aperture region of a memory for transfer to the video memory of the GPU. The GPU is then used to generate a two-dimensional or three-dimensional image. The GPU is used to perform a medical imaging process, such as an ultrasound imaging process. The processed data is transferred to a different processor. Since the GPU provides various parallel processors, the GPU may more efficiently perform image processes different from rendering a two-dimensional or three-dimensional image.

13 Claims, 2 Drawing Sheets

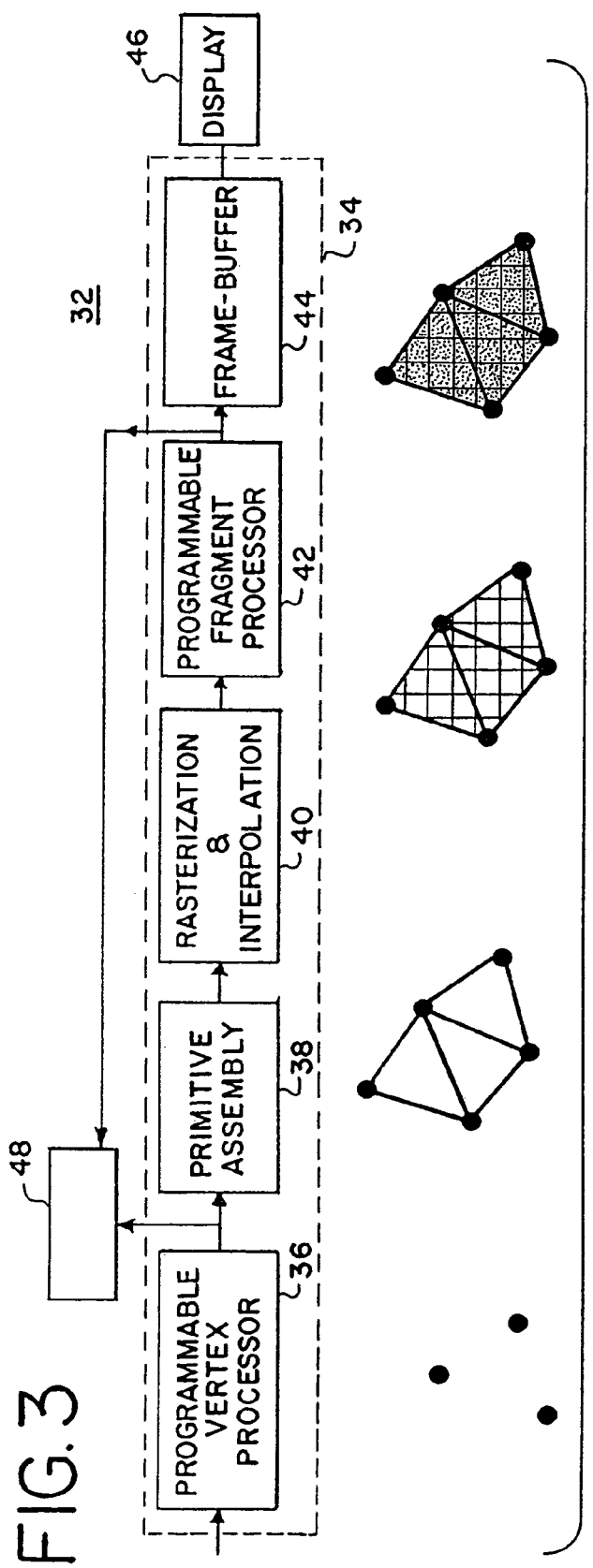

GRAPHICS PROCESSING UNIT FOR SIMULATION OR MEDICAL DIAGNOSTIC IMAGING

BACKGROUND

The present invention relates to a graphics processing unit. Loading and processing data with the graphics processing unit (GPU) is controlled.

GPUs are provided as videocards on personal computers. Using the AGP specification, a central processing unit (CPU) coordinates the transfer of data from a random access memory to the GPU for video rendering. A memory control hub is connected by various buses to each of a source, a RAM, the CPU and the GPU. For example, an AGP chip set is used as a memory control hub. The memory control hub controls the data transfers between any of the various interconnected devices. The data is obtained from the source, such as a CD, diskette, or hard drive. The data from the source is routed to a random access memory (RAM). The CPU then copies the data from the random access memory into the CPU cache memory. For use of the GPU, the CPU copies the data to a graphics aperture region of the RAM controlled pursuant to a graphics aperture resource table (GART). Prior to copying the data to the graphics aperture region, the CPU may also reformat the data. This is because the GPU expects the data to be in a particular format in order to deliver maximum throughput. The data from the graphics aperture region is then transferred through an accelerated graphics port (AGP) to the video memory of the GPU. The GPU then performs various rendering or video processing and outputs a resulting image to a display. Pursuant to an application programming interface (API), the CPU controls operation of the GPU.

Since the CPU copies the data from the RAM to the graphics aperture region of the RAM, the data is copied multiple times. Any loading on the CPU for other processing may delay the transfer of data to the GPU. Since the CPU operations may be interrupted, the transfer of data to the GPU is inconsistent or non-deterministic.

The AGP hardware discussed above may be used in a medical diagnostic ultrasound system, such as disclosed in U.S. Pat. No. 6,358,204, the disclosure of which is incorporated herein by reference. The memory control hub connects a CPU to a memory. The two other ports of the memory control hub are connected to two different buses, one a system bus and another an ultrasound data bus. The ultrasound data bus connects to a source of ultrasound data as well as outputs of ultrasound data, such a scan converter connected with the display.

BRIEF SUMMARY

By way of introduction, the preferred embodiments described below include methods and systems for simulation or medical diagnostic imaging with a graphics processing unit. In one embodiment, data to be processed by a graphics processing unit is transferred from a source to the graphics processing unit without copying by the central processing unit. For example, the central processing unit does not copy data to the cache. Instead, the source of data transfers the data directly to the graphics processing unit or directly to a graphics aperture region of a memory for transfer to the video memory of the GPU. The GPU is then used to generate a two-dimensional or three-dimensional image.

In another embodiment, the GPU is used to perform a medical imaging process, such as an ultrasound imaging process. The processed data is transferred to a different processor. Since the GPU provides various parallel processors, the GPU may more efficiently perform data processing different from rendering a two-dimensional or three-dimensional image.

In a first aspect, a graphics processing unit system is provided for diagnostic medical ultrasound imaging. A graphics processing unit has an input and at least one output. The graphics processing unit is operable to process ultrasound data from the input. A processor connects with the output of the graphics processing unit. The processor is operable to process ultrasound data output on the output of the graphics processing unit.

In a second aspect, a method for diagnostic medical ultrasound imaging with a graphics processing unit is provided. Ultrasound data is processed with the graphics processing unit. Ultrasound data output from the graphics processing unit is then further processed with a different processor prior to generating a display responsive to the ultrasound data. A display responsive to the ultrasound data is then generated.

In a third aspect, an improvement in a method for loading a video memory of a graphics processing unit is provided. A central processing unit interacts with a memory, such as a RAM memory, and the graphics processing unit. In the improvement, data is loaded into the video memory without storing the data in a cache of the central processing unit.

In a fourth aspect, a system for loading a video memory of a graphics processing unit is provided. A central processing unit connects with the graphics processing unit. The central processing unit is operable to run an application programming interface of the graphics processing unit. A source of data connects with the graphics processing unit. The data is transferable from the source to the video memory without copying of the data by the central processing unit.

The present invention is defined by the claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3 is a block diagram of one embodiment of a graphics processing unit and interconnected processor; and FIG. 4 is a flow chart diagram of one embodiment of a method for processing in diagnostic medical ultrasound data with a graphics processing unit.

DETAILED DESCRIPTION OF THE DRAWINGS AND PRESENTLY PREFERRED EMBODIMENTS

In one aspect, the routing of data for loading into a video memory of a GPU is controlled. In another aspect, the GPU performs image processing different than two- or three-dimensional rendering of an image. In another aspect, the GPU performs general mathematical computations. In yet another aspect, the GPU performs two or three-dimensional renderings of an image. In another aspect, a combination of the two aspects discussed above is provided. The different aspects may be used independently or separately in other embodiments. Immediately below, embodiments directed to loading data into the video memory are provided. Subsequently, embodiments directed to performing different processes with the GPU are provided.

Figure 1:
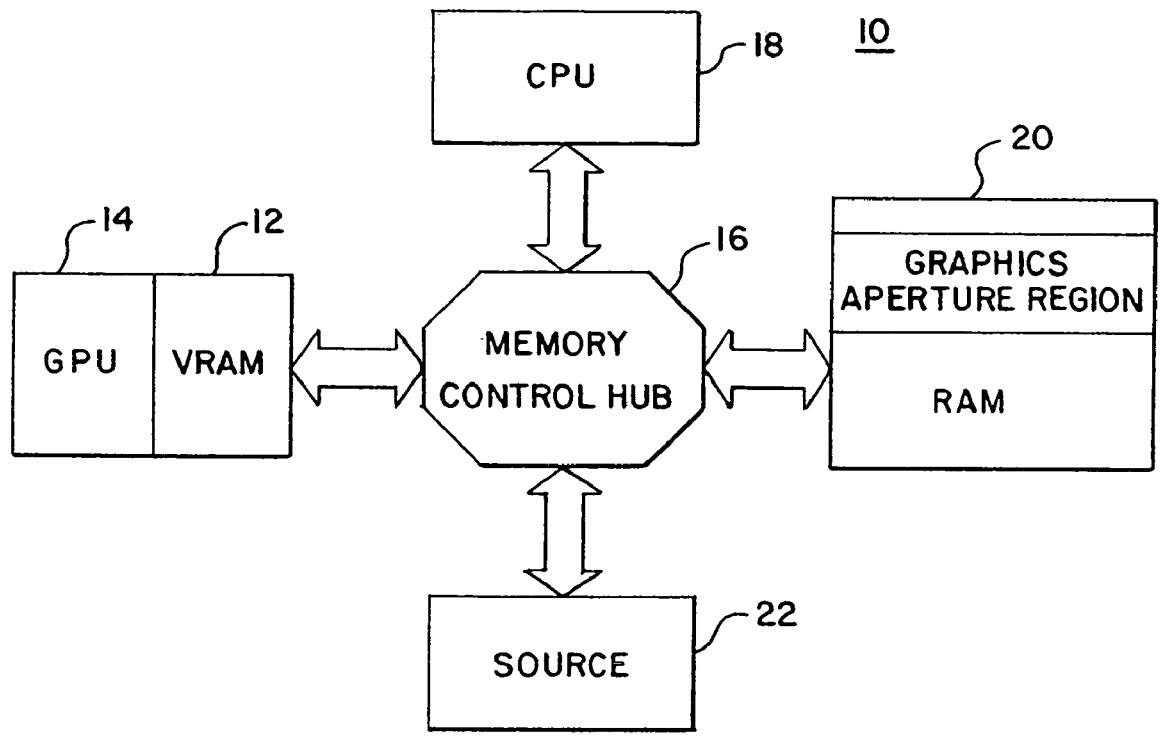
FIG. 1 is a block diagram of one embodiment of a system for loading a video memory of a graphics processing unit.

FIG. 1 shows one embodiment of a system 10 for loading a video memory 12 of a GPU 14. A memory control hub 16 interconnects the GPU 14 with the CPU 18, a memory 20 and a source of data 22. Additional, different or fewer components may be provided. For example, the GPU 14 connects to the source 22 without one or more of the memory control hub 16, the CPU 18 and the memory 20. As another example, an additional component connects to the memory control hub 16. The system 10 is a system configured pursuant to the AGP specification, but may be configured pursuant to different specifications, such as PCI, PCI-X, PCI Express, or arrangements with or without any of the various components. In one embodiment, the system 10 is a personal computer for generating graphical images, such as simulations. The system 10 may also be used as a work station for generating graphical images from data representing an object, such as a scanned picture. In yet another embodiment, the system 10 is a medical imaging system, such as an X-ray, MRI, computer tomography, diagnostic ultrasound or other now known or later developed medical imaging system.

The GPU 14 is a processor, circuit, application specific integrated circuit, digital signal processor, video card, combinations thereof or other now known or later developed device for graphics processing. In one embodiment, the GPU 14 is a graphics processor or video card provided by nVIDIA, ATI or Matrox. These or other devices using an API of OpenGL, DirectX or other now known or later developed APIs may be used. In one embodiment, the GPU 14 includes one or more vertex processors, such as 16 vertex processors, and one or more fragment processors, such as 64 fragment processing units. Other analog or digital devices may also be included, such as rasterization and interpolation circuits. One or more frame buffers may be provided for outputting data to a display. The GPU 14 receives data in one or more formats and generates 2 or 3 dimensional images based on the data, such as by performing texture mapping or other 2 or 3 dimensional rendering. For example, the data received represents various objects with associated spatial relationships. The GPU 14 is operable to determine the relative positioning of the data and generate fragments representing data visible from a particular viewing direction. GPU 14 is operable to decompress data, so that the bandwidth of data transferred to the GPU 14 is maximized through compression. Alternatively, uncompressed data is transferred to the GPU 14.

The GPU 14 includes the video memory 12. In one embodiment, the video memory 12 is a random access memory, but other now known or later developed memories may be used. The video memory 12 stores any of various amounts of information, such as 64, 128, 256 or other number of kilobytes. The GPU 14 accesses information from the video memory 12 for graphics processing. Graphics processing is performed pursuant to the API run by the CPU 18.

The CPU 18 is a general processor, application specific integrated circuit, dedicated processor, digital signal processor, digital circuit, analog circuit, combinations thereof or other now know or later developed processing device. In one embodiment, the central processing unit 18 is a processor operable to control a system pursuant to the AGP specification. In alternative embodiments, processors operating pursuant to the same or different specifications may be provided. In one embodiment, the CPU 18 is configured in a parallel processing arrangement, such as including two or more processors for controlling or processing data. Any various or now known or later developed processors may be used. The CPU 18 connects with the GPU 14 for running an application programming interface of the GPU 14. The CPU 18 provides instructions pursuant to the API for controlling the graphics rendering. The CPU 18 implements a driver for the GPU 14 operable to accept pre-formatted data without processing by the CPU 18. The CPU 18 also controls the memory control hub 16 and associated memory 20. In one embodiment, the CPU 18 controls or processes data from the source 22. Alternatively, the source 22 operates independently of the CPU 18.

The memory 20 is a random access memory, such as arranged in one, two or more different chips or chip sets. Other now known or later developed memories may be used. The memory 20 is connected with the CPU 18, such as through the memory control hub 16 for allowing the CPU 18 access to the memory 20. The memory 20 is controlled by the CPU 18. In one embodiment, the memory 20 has a common address scheme accessible by the memory control hub 16 or the CPU 18. A section or group of addresses of the memory 20 is assigned as a graphics aperture region. The addresses associated with the graphics aperture region identify addresses for data to be transferred to the video memory 12. The graphics aperture region is generally not accessible for uses other than transfer of data to the GPU 14. In one embodiment, the size of the graphics aperture region matches the size of the video memory 12. In alternative embodiments, the graphics aperture region is accessible for other uses or may be a different size than the video memory 12. The GPU 14, the memory control hub 16 or the CPU 18 causes data stored in the graphics aperture region to be transferred or copied to the video memory 12. In one embodiment, the graphics aperture region and common address scheme are configured as part of a contiguous memory controlled by a Graphics Address Re-mapping Table (GART) for controlling access to the memory 20.

In one embodiment, the graphics aperture region is operable to slide or change memory addresses in an address loop. The addresses of the graphics aperture region slide within the memory 20 such that the start and end memory locations of the graphics aperture region can be incremented or decremented within the region. When the upper or lower ends of the graphics aperture region are reached, the address is shifted to the opposing lower or upper end respectively in a circular fashion. As a result, a memory loop of graphics data is provided within the graphics aperture region. In alternative embodiments, the memory 20 is divided up into separately accessible sections or includes multiple devices that are separately controlled and accessed.

The source 22 is a database, memory, sensor, CD, disk drive, hard drive, tape, tape reader, modem, computer network, or other now known or later developed source of graphics data. In one embodiment, the source 22 is a program or software operated by the CPU 18 to generate a graphics simulation. In another embodiment, the source of data 22 is a medical sensor, such as an x-ray, MRI, computer tomography or medical diagnostic ultrasound scanner. Medical diagnostic imaging data is provided by the source 22. For example, the source 22 is an ultrasound beamformer operable to receive acoustic echoes representing a patient. Ultrasound data includes in-phase and quadrature data from a beamformer and Spectral Doppler data. The ultrasound beamformer generates one or more data samples representing different spatial locations along a plurality of beams of a scan of a patient. Frames of data representing each two- or three-dimensional region are then output. The ultrasound data is detected using any of various detectors, such as B-mode, Doppler, harmonic, contrast agent or other now known or later developed detectors. In one embodiment, the ultrasound beamformer provides the data prior to beamforming, ultrasound data prior to detection, or ultrasound data after detection. The source of data 22 is connected with the GPU 14 either directly or through one or more devices as shown in FIG. 1.

In one embodiment, the source 22 includes a processor, a buffer, or formatter for configuring the data. For example, a buffer and processor are used with an ultrasound beamformer for GPU-specific formatting of texture data acquired in a polar coordinate format into three-dimensional texture rendering by the GPU 14. In one embodiment, the GPU 14 uses a format for three-dimensional texturing to optimize memory access speeds. The data is arranged in an order to provide a GPU-specific format for data transfer. In alternative embodiments, the GPU 14 includes a buffer, processor or formatter for GPU-specific formatting of the data. For 3D texture or other data, different formats, may be used for the data provided from the source 22 or for the data used by the GPU 14.

In one embodiment, the source 22 is operable to provide data representing a three-dimensional volume. For example, an ultrasound medical sensor and associated beamformer are operable to scan a patient in a three-dimensional or volume region. The scan is performed using a mechanically-moved or multi-dimensional transducer array to scan a volume by firing a plurality of ultrasound lines. Ultrasound data is then provided in sets of data representing a three-dimensional volume. More than one set may represent the same volume at a same time, such as providing a Doppler set and a B-mode set of data. For four-dimensional imaging, a plurality of sets representing the volume at different times is provided. As another example, two sets of data, processed differently, are used. Processing includes filtering. Spatial, frequency or other filtering may be provided for processing the data. One processed set of data is used for three-dimensional volume rendering. The other processed set of data is used for generating two-dimensional representations or slices of the volume. In one embodiment using a graphics aperture region for four-dimensional volume rendering, one processed set of data is overwritten as each set is acquired to conserve memory space. The other processed set of data is maintained throughout a time period for later processing, three-dimensional rendering or two-dimensional imaging. Alternatively, both processed data sets are stored representing volumes at multiple times. In one embodiment, sets of data are maintained until the extent of the graphics aperture region has been used. The addresses are then looped back to data representing the earliest set, and the more recently acquired data is overwritten in a CINE loop fashion.

The memory control hub 16 is a processor, a bus, an application specific integrated circuit, an AGP chip set, an AGP controller, combination thereof or other now known or later developed device for interfacing between two or more of the GPU 14, CPU 18, memory 20 and the source 22. In one embodiment, a single device is provided for the interface, such as a single circuit or chip, but multiple devices may be provided in any of various possible architectures for transferring data between any two or more of the devices connected with the memory control hub 16. In yet alternative embodiments, the various devices directly connect through a single data bus or with each other without the memory control hub 16. Memory control hub 16 connects with the GPU 14 with an accelerated graphics bus, connects with the CPU 18 with a host or front side bus, connects with the memory 20 with a memory bus, and connects with the source 22 with a PCI-X or PCI acquisition bus. Different buses or signal lines may be used for any of the various connections discussed above, including now known or later developed connections.

Rather than routing the data from the source 22 to the memory 20, then through the CPU 18 to the graphics aperture region of the memory 20, and finally from the graphics aperture region to the video memory 12, the data is routed from the source 22 to the graphics aperture region or to the video memory 12 without copying or loading of the data by the CPU 18. The data from the source 22 is routed using a driver, software or other control implemented by the memory control hub 16, the CPU 18, the GPU 14 or another device. The data from the source 22 is operable to route to the video memory 12 through the memory control hub 16 without passing to the CPU 18. For example, the data for processing by the GPU 14 is not stored in the cache memory of the CPU 18.

In one embodiment, the data from the source 22 is operable to be routed to the video memory 12 from the source 22 through the graphics aperture region of the memory 20 without passing to the CPU 18. The data is written to the memory 20 directly into the graphics aperture region for transfer or copying to the video memory 12 by the memory control hub 16. In another embodiment, the data is operable to be routed to the video memory 12 from the source 22 without passing to the CPU 18 or the associated memory 20. The memory 20, including the graphics aperture region, is avoided by directly routing the data from the source 22 to the video memory 12.

Figure 2:
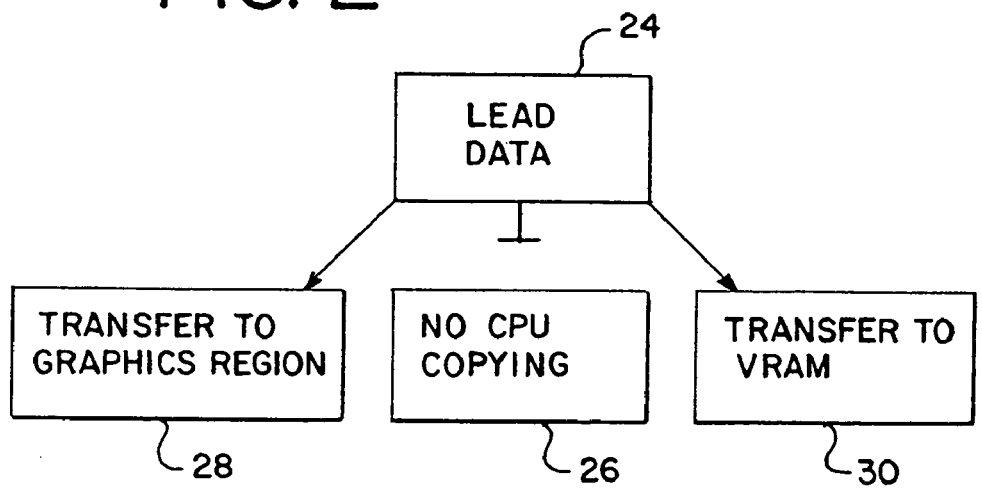
FIG. 2 is a flow chart diagram of one embodiment of a method for loading a video memory of a graphics processing unit.

FIG. 2 shows a method for loading a video memory of a graphics processing unit using the system 10 of FIG. 1 or another system. The CPU interacts with a memory separate from the GPU. An improvement is provided by loading data into the video memory without storing the data in a cache of the CPU in act 24. As represented by the disconnect between acts 24 and acts 26, the CPU does not load the data from the source for the GPU into the cache of the CPU. The data is provided to the GPU 14 without copying by the CPU, such as without copying from one location of the memory 20 to a graphics aperture region of the memory.

In response to user selections or otherwise configuring the system, the CPU begins an application program using the GPU. For example, a user selects three-dimensional or four-dimensional imaging. The CPU then instructs the GPU to become the bus-master and download data from the graphics aperture region or the source. The video memory is loaded without processing the data by the CPU during the transfer. The data is transferred without GPU-specific formatting (e.g., swizzling) or copying by the CPU. The CPU performs control aspects of the data transfer by signaling the GPU and/or other devices.

In act 28, the data is transferred to a graphics aperture region of the memory associated with the CPU, such as a RAM. For example, ultrasound data is written from a beamformer or other medical sensor into the graphics aperture region of the memory of FIG. 1. The source writes the data directly into the graphics aperture region. In one embodiment, the data is formatted for use by the GPU and output from the source. As a result, the GPU-specific formatting by the CPU for three-dimensional texture data is avoided. The source performs any GPU-specific formatting. Alternatively, the data is provided to the graphics aperture region without a particular format for the GPU. In this example, the GPU-specific formatting is performed by the GPU after transfer to the GPU.

The data written into the graphics aperture region is transferred to the video memory without processing or copying of the data by the CPU. For example, the GPU acquires control of the bus or a portion of the bus connected with the memory having the graphics aperture region (i.e., GPU bus-masters.). The GPU then downloads the data from the graphics aperture region into the video memory. Alternatively, the CPU, the memory control hub, the source or another device controls one or more buses to cause the transfer of the data to the graphics aperture region. While the CPU is operable to run an application programming interface for controlling the GPU, the CPU operates free of copying data between different locations of the memory for transfer to the video memory.

In one embodiment, the source writes the data to the graphics aperture region where the graphics aperture region slides by using an address loop as discussed above. All or a portion of the graphics aperture region uses the looping address structure to allow one type of data or all of the data to be configured in a loop fashion for representing a volume or area at different times.

As an alternative to act 28, the source writes the data to the video memory in act 30, such as transferring the data to the video memory without storing the data in a graphics aperture region. Based on control signals from the CPU or other device, the GPU controls the transfer or otherwise acquires the data from the source. Alternatively, the source, the memory control hub, or the CPU controls one or more buses for causing the data to be written to the video memory.

In alternative embodiments, some data output by the source is directed to the video memory without transfer to the graphics aperture region while other data is transferred to the video memory through the graphics aperture region. In yet other alternative embodiments, a subset of data may be copied by the CPU, stored in the cache of the CPU or otherwise processed by the CPU as part of the transfer to the video memory. CINE-buffering or otherwise providing storage of different representations of the same volume at different times is provided in the video memory or as a function of the timing of the output of data from the source.

In either of the embodiments of acts 28 or 30, the data is formatted for the GPU without processing by the CPU. Any of various formats may be provided. In one embodiment, the formatting includes compression of the data prior to the transfer to the video memory. After the transfer to the video memory, the data is decompressed with the GPU. Any of lossy or lossless compression schemes now known or later developed may be used, such as texture compression.

By transferring data to the GPU without copying by the CPU, the transfer speed between the source and the GPU may be increased. Increased transfer speed may allow for increased volume rendering rates from three-dimensional or four-dimensional imaging. Any interrupts or other processing performed by the CPU may not delay the transfer of data to the GPU. Windows or other operating system latencies may have no or minimal affect on the volume rendering by the GPU. Increased volume rendering rates due to increased data transfer rates may allow for four-dimensional cardiology volume rendering. Overlapping pipeline sequences for transferring data or other operations to increase parallel transfers of data may also increase transfer rates.

FIG. 3 shows a graphics processing unit system 32 for diagnostic medical ultrasound imaging. The system 32 includes a GPU 14 in the configuration discussed above for FIG. 1, in a configuration disclosed in any one of application Ser. No. 10/644,363 now pending, and application Ser. No. 10/388,128, now U.S. Pat. No. 6,852,081, the disclosures of which are incorporated herein by reference, or other GPUs provided any where in medical diagnostic ultrasound systems (e.g., a system with an ultrasound transducer or a workstation for processing ultrasound data).

The GPU 34 includes a programmable vertex processor 36, a primitive assembly processor 38, a rasterization and interpolation processor 40, a programmable fragment processor 42 and a frame buffer 44. Additional, different or fewer components may be provided. Any of the processors of the GPU 34 are general processors, digital circuits, analog circuits, application specific integrated circuits, digital processors, graphics accelerator card, display card or other devices now known or later developed. In one embodiment, the GPU 34 is implemented as a series of discreet devices on a mother board or as a daughter board, but may be implemented as a single chip, a circuit on a card or other layout. The programmable vertex processor 36 is a group of 16 parallel processing units in one embodiment, but fewer or greater number of processors may be provided. The fragment processor 42 is a parallel arrangement of 64 processing units in one embodiment, but more or fewer processing units may be provided.

FIG. 3 shows the graphics processing pipeline standardized by APIs such as OpenGL and DirectX. The GPU 34 includes a programmable vertex processor 36, a primitive assembly 38, a rasterization and interpolation block 40, a programmable fragment processor 42 and a frame-buffer 44. The input to the vertex processor 36 is a set of vertices in two- or three-dimensional space. Each vertex has a set of attributes such as coordinates, color, texture coordinates, etc. The vertex processor 36 transforms the coordinates of the vertices into a frame of reference. The output of the vertex processor 36 is a set of vertices with new attributes changed by the vertex processor 36. These vertices are fed into the next stage, the primitive assembly 38. Here, the vertices are grouped together to form points, lines and triangles. These primitives are then fed into the rasterization and interpolation stage 40. This stage rasterizes each primitive, such as points, lines and triangles, into a set of fragments. A fragment is a pixel with a depth associated with it and is located on a primitive. The fragments have attributes such as color, coordinates and texture coordinates, etc. The next stage, programmable fragment processor 42 takes in these fragments, applies various processes on them, and creates pixels. The pixels have attributes, such as color, and are written into the final stage, the frame-buffer 44. Other now known or later developed structures and processes may be used in the graphics pipeline for graphics rendering. The blocks shown in FIG. 3 are high level blocks. Each block contains many other finer processing stages. For example, the rasterization and interpolation stage 40 can contain such operations such as Scissor Test, Alpha Test, Stencil Test, Depth Test, etc. The frame buffer 44 is a memory, buffer or other device for receiving the pixels from the fragment processor 42 for display on the display 46.

The GPU 34 is operable to receive graphics data and generate a display on the display 46 from the graphics data. The process is performed pursuant to an application programming interface, such as GDI, GDI+, DirectX, OpenGL, or other APIs now know or later developed. Additionally or alternatively, the GPU 34 is used to process ultrasound data for other purposes than this immediate display. For example, in-phase and quadrature data, post detection data, log compressed data, scan converted or any other ultrasonic data is input to the GPU 34. Using the programmable vertex processor 36 and/or the fragment processor 42, the ultrasound data is processed. OpenGL, DirectX extensions or other programming languages, such as Cg shader language, program the GPU 34 to process ultrasound data. HLSL, Stanford's high-level shader language or other now known or later developed shader languages may also be used. Some resource intensive computations are performed by the GPU 34 rather than another processor, such as a CPU, DSP, ASIC or FPGA. Since the GPU 34 functions as a computational engine, one or more additional outputs are provided. For example, an output is provided downstream of the programmable vertex processor 36 but upstream of the fragment processor 42. As an alternative or additional output, an output is provided after the fragment processor 42. Alternatively, the output from the frame buffer is used.

Either or both of the vertex processor 36 and fragment processor 42 are programmed to perform ultrasound data processing. For example, the vertex processor 36 is programmed or operable to perform scan conversion operations. Using the vector or matrix type polar coordinate data, the vertex processor reformats each special location into a format appropriate for a display. As another example, the fragment processor 42 is operable to perform Fourier transforms or non-linear scan conversion operations. Scan converted ultrasound data output by the vertex processor 36 is provided to the programmable fragment processor 42 for non-linear operations through interpolation or other fragment processes.

In one embodiment, the GPU 34 is operable to process ultrasound data and provide the processed data to a different image processor 48. The image processor 48 provides data for the display 46 or routes data back to the GPU 34 for rendering to the display 46.

The processor 48 is a general processor, applications specific integrated circuit, digital signal processor, image processor, FPGA, CPU, analog circuit, digital circuit, combinations thereof or other now known or later developed device for processing ultrasound data. The processor 48 is operable to process ultrasound data output by the GPU 34. For example, the processor 48 and GPU 34 are provided as part of an ultrasound data path beginning at a beamformer and ending at the display 46. The GPU 34 implements at least a part of one ultrasound process, such as receive beamformation, scan conversion, motion detection, other ultrasound process or combinations thereof. The processor 48 implements at least part of a same or different ultrasound process, such as detection, motion tracking, beamforming, filtering, scan conversion, other ultrasound process, or combinations thereof. The vertex processor 36 and the fragment processor 42 have independent instruction sets assembled by the shader language or other programming interface. Ultrasonic data sent to the GPU 34 is processed by the vertex processor and/or fragment processor 42 for implementing ultrasound imaging processes.

Since the GPU 34 may be less likely to be interrupted than a central processing unit or other processors, the GPU 34 may provide more consist or reliable image processing. While a clock rate is lower or higher, even lower clock rates may provide faster image processing given the parallel processing provided the GPU 34. The GPU 34 is capable of carrying out a large number of floating point parallel computations.

FIG. 4 shows a method for diagnostic medical ultrasound imaging with a graphics processing unit. In act 56, a GPU processes ultrasound data. For example, at least a part of an ultrasound process of receive beamformation, scan conversion, motion detection or other ultrasound processes are performed by the GPU. In one embodiment, the programmable vertex processor 36 and/or programmable fragment processor 42 are used to perform the ultrasound process. GPUs have optimized architectures for vector and matrix data types. Vector and matrix processes are used for ultrasonic data processing, such as receive beamformation, scan conversion, motion tracking or correlation processes.

For example, receive beamformation is performed by combining data from a plurality of different channels, such as 128 channels over time. The GPU alters the relative position along a temporal dimension of the data across the channels with the vertex processor, and weights the data and combines the data associated with a particular location across the 128 or other number of channels with the fragment processor. As another example for receive beamformation, a fast Fourier transform and an inverse Fourier transformed are used for receive beamformation. The vertex processor passes the ultrasound data to the fragment processor. Fragment processor identifies a fragment value, finds a neighbor, and combines the fragments with a weight. Using feedback to the input of the programmable fragment processor 42 or the input of the GPU, an iterative process is implemented to provide the fast Fourier transform. The data is then exported for further receive beamformation processing by the processor 48. Alternatively, the GPU 34 performs the further process. The GPU 34 is then used to apply an inverse fast Fourier transform. The inverse data represents beamformed data or plurality of samples representing different locations within a patient. The Fourier and inverse Fourier transforms implemented by the GPU 34 are described in U.S. Pat. No. 6,685,641 (application Ser. No. 10/061,402, the disclosure which is incorporated herein by reference.

As another example, the vertex processor reformats data from a polar coordinate system unto a Cartesian coordinate system. For example, a scan conversion is implemented by assigning coordinates associated with current data as a function of the new format. A linear interpolation by the rasterization and interpolation processor completes the scan conversion. For non-linear scan conversion processes, the fragment processor 42 implements the non-linear function.

As another example, motion tracking or motion detection using correlation or other processes is performed by the GPU 34. Any of the vertex processor or fragment processor may be used for implementing correlation functions, such as cross correlation or minimum sum of absolute differences. Other ultrasound processes may be performed with the GPU 34. Depending on the component of the GPU 34 implementing the process, any of the various outputs to the image processor 48 may be used.

In act 58, the ultrasound data output from the GPU 34 is processed with a different processor, the additional processing is performed prior to generating a display responsive to the data input to the GPU 34. For example, the processor 48 implements filtering, detection, scan conversion, beamformation, motion detection or another ultrasound process. The data output by the processor 48 is provided to the display 46 either through or without passing through the GPU 34. For example, the GPU 34 processes data for a three dimensional representation using an ultrasound process. The data is then provided to the processor 48 and/or additional devices for further ultrasound processing, such as filtering. The ultrasound data is then provided back to the GPU 34 for graphics processing and output to the display 46.

In act 60, the ultrasound data is output to the display. The display is responsive to the ultrasound data processed one or more times by the GPU 34 and another or different processor. The GPU has multiple programmable processors while being relatively cheap. The large parallel processing capability is less susceptible to interrupts than processors operating pursuant to an operating system. Using high-level languages, the GPU is programmed to perform an ultrasound process.

While the invention has been described above by reference to various embodiments, it should be understood that any changes and modifications can be made without departing from the scope of the invention. For example, the GPU implements only graphics processing or may implement the ultrasound processing as well as graphics processing. As another example, the GPU for implementing ultrasound processing is provided in a system different than described above for FIG. 1. Similarly, the system described for FIG. 1 uses the GPU for graphics processing or other volume rendering of ultrasound or non-ultrasound data without ultrasound processing by the GPU. The drivers or software may be adapted for use with reprogrammable processors or GPU, such as provided by reprogramming an FPGA during use or by service personal.

It is therefore intended that the foregoing detailed description be regarded as illustrative rather than limiting, and that it be understood that it is the following claims including all equivalents, that are intended to define the spirit and the scope of this invention.

We claim:

1. A graphics processing unit system for diagnostic medical ultrasound imaging, the system comprising:
   a graphics processing unit having an input, at least one of a vertex processor and a fragment processor, and at least one output, the graphics processing unit operable to process first ultrasound data from the input; and
   a processor connected with the at least one output, the processor operable to process second ultrasound data output on the at least one output of the graphics processing unit;
   further comprising an ultrasound data path beginning at a beamformer and ending at a display wherein the graphics processing unit implements at least a part of a first ultrasound process selected from the group of: receive beamformation, scan conversion, motion detection and combinations thereof and the processor implements at least a part of a second ultrasound process selected from the group of: detection, motion tracking, filtering, scan conversion, and combinations thereof.

2. The system of claim 1 wherein the graphics processing unit comprises the fragment processor responsive to an output of the vertex processor.

3. The system of claim 2 wherein the at least one output is downstream from the vertex processor and upstream from the fragment processor.

4. The system of claim 2 wherein the at least one output is downstream from the vertex processor and the fragment processor.

5. The system of claim 1 wherein the at least one output comprises at least two outputs, a first one of the at least two outputs connected with the processor and a second one of the at least two outputs connected with a display.

6. The system of claim 1 wherein the processor comprises an image processor.

7. The system of claim 2 wherein the vertex processor is operable to perform a scan conversion operation.

8. The system of claim 2 wherein the fragment processor is operable to perform one of: a Fourier transform and a non-linear scan conversion operation.

9. A method for diagnostic medical ultrasound imaging with a graphic processing unit, the method comprising:
   (a) processing first ultrasound data with one of a vertex processor and a fragment processor of a graphics processing unit;
   (b) processing second ultrasound data output from the graphics processing unit with a different processor connected to the graphics processing unit prior to generating a display responsive to the first ultrasound data; and
   (c) generating a display responsive to the second ultrasound data;
   wherein (a) comprises performing at least a part of a first ultrasound process selected from the group of: receive beamformation, scan conversion, motion detection and combinations thereof and wherein (b) comprises performing at least a part of a second ultrasound process selected from the group of: detection, motion tracking, filtering, scan conversion, and combinations thereof.

10. The method of claim 9 wherein (b) comprises image processing the second ultrasound data.

11. The method of claim 9 wherein (a) comprises performing a scan conversion operation with the vertex processor.

12. The method of claim 9 where in (a) comprises performing a scan conversion operation with the fragment processor.

13. The method of claim 9 wherein (a) comprises performing one of: a Fourier transform and a non-linear scan conversion operation with the fragment processor.

* * * * *